(12) United States Patent
Oh et al.

(10) Patent No.: US 10,919,270 B2
(45) Date of Patent: Feb. 16, 2021

(54) LAMINATED GLASS AND MANUFACTURING METHOD FOR LAMINATED GLASS

(71) Applicant: LG CHEM, LTD., Seoul (KR)

(72) Inventors: Jun Hak Oh, Daejeon (KR); Jae Hyuk Yoon, Daejeon (KR); Chang Hee Lee, Daejeon (KR); Byung Kook Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/096,615

(22) PCT Filed: Apr. 25, 2017

(86) PCT No.: PCT/KR2017/004343
§ 371 (c)(1),
(2) Date: Oct. 25, 2018

(87) PCT Pub. No.: WO2017/188686
PCT Pub. Date: Nov. 2, 2017

(65) Prior Publication Data
US 2019/0134953 A1 May 9, 2019

(30) Foreign Application Priority Data
Apr. 26, 2016 (KR) .......................... 10-2016-0050973

(51) Int. Cl.
| B32B 17/10 | (2006.01) |
| B32B 7/12 | (2006.01) |
| C03B 23/03 | (2006.01) |
| C03C 27/06 | (2006.01) |
| C03C 27/10 | (2006.01) |
(Continued)

(52) U.S. Cl.
CPC .......... *B32B 17/10082* (2013.01); *B32B 7/12* (2013.01); *B32B 17/10036* (2013.01); *B32B 17/10119* (2013.01); *C03B 23/0302* (2013.01); *C03C 3/087* (2013.01); *C03C 27/06* (2013.01); *B32B 2250/03* (2013.01); *B32B 2605/00* (2013.01)

(58) Field of Classification Search
CPC ........ B32B 17/10082; B32B 17/10036; B32B 17/10119; B32B 2250/03; B32B 17/10; B32B 17/10761
See application file for complete search history.

(56) References Cited

U.S. PATENT DOCUMENTS 5,928,793 A 7/1999 Kimura
6,309,901 B1 * 10/2001 Tahon .................... G03C 1/795
438/29
(Continued)

FOREIGN PATENT DOCUMENTS

CA 2944082 A1 10/2015
CN 103501998 A 1/2014
(Continued)

*Primary Examiner* — Joanna Pleszczynska
(74) *Attorney, Agent, or Firm* — Dentons US LLP

(57) ABSTRACT

Provided is a laminated glass, comprising: a soda lime glass; and a non-tempered alkali-free glass bonded to one surface of the soda lime glass, in which a thickness of the soda lime glass is larger than a thickness of the non-tempered alkali-free glass, and an elastic modulus of the non-tempered alkali-free glass is larger than an elastic modulus of the soda lime glass.

11 Claims, 4 Drawing Sheets

(51) Int. Cl.
    *C03C 27/12*     (2006.01)
    *C03C 3/087*     (2006.01)

(56) References Cited

U.S. PATENT DOCUMENTS

| | | | |
|---|---|---|---|
| 8,053,079 B2 * | 11/2011 | Aoki | B32B 17/10045 |
| | | | 428/426 |
| 8,816,493 B2 * | 8/2014 | Nogami | H01L 23/10 |
| | | | 257/680 |
| 2009/0270242 A1 * | 10/2009 | Yanase | C03C 3/091 |
| | | | 501/67 |
| 2012/0128952 A1 | 5/2012 | Miwa et al. | |
| 2012/0280368 A1 | 11/2012 | Garner et al. | |
| 2013/0295357 A1 | 11/2013 | Cleary et al. | |
| 2014/0171286 A1 | 6/2014 | Lee et al. | |

FOREIGN PATENT DOCUMENTS

| | | | |
|---|---|---|---|
| CN | 103681522 A | 3/2014 | |
| JP | 2014-522325 A | 9/2014 | |
| JP | 2015093401 A | 5/2015 | |
| KR | 1020090125537 A | 12/2009 | |
| KR | 1020130025839 A | 3/2013 | |
| KR | 1020140088704 A | 7/2014 | |
| KR | 10-2015-0002657 A | 1/2015 | |
| KR | 101742108 B | 6/2017 | |
| WO | 2011/152380 A1 | 12/2011 | |
| WO | 2013154035 A | 10/2013 | |
| WO | 2015/158464 A1 | 10/2015 | |

* cited by examiner

[Figure 1]
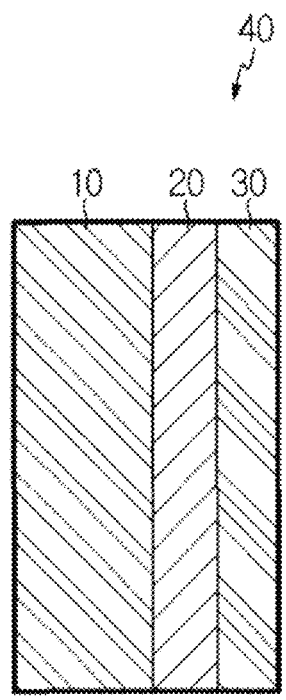
[Figure 2A]
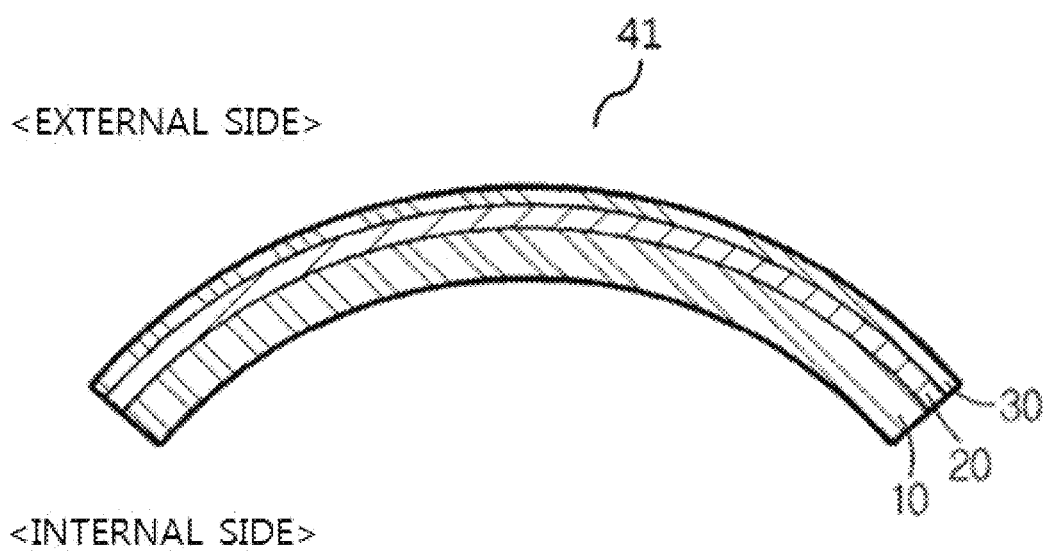

[Figure 2B]
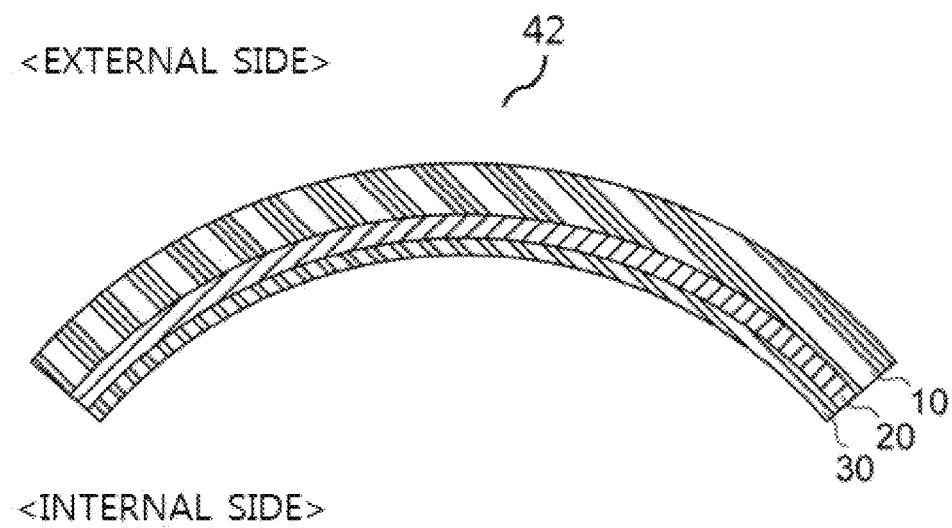

[Figure 3]
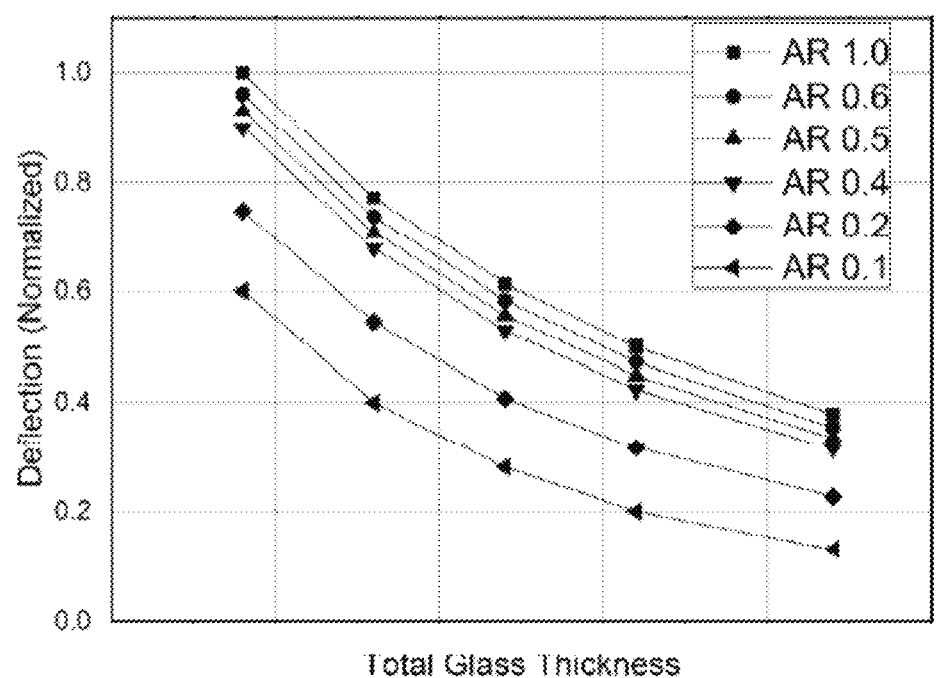
[Figure 4]
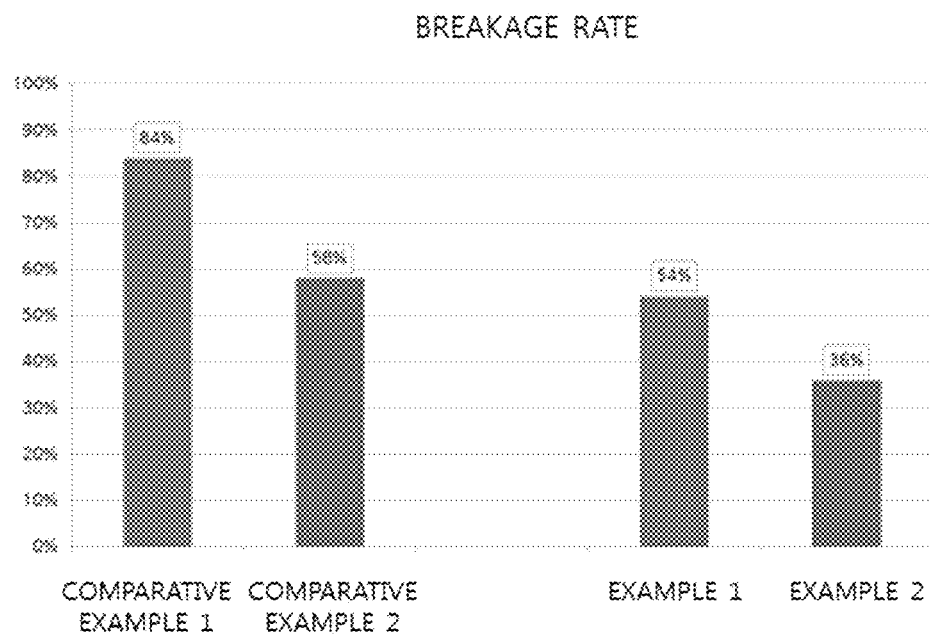

[Figure 5]
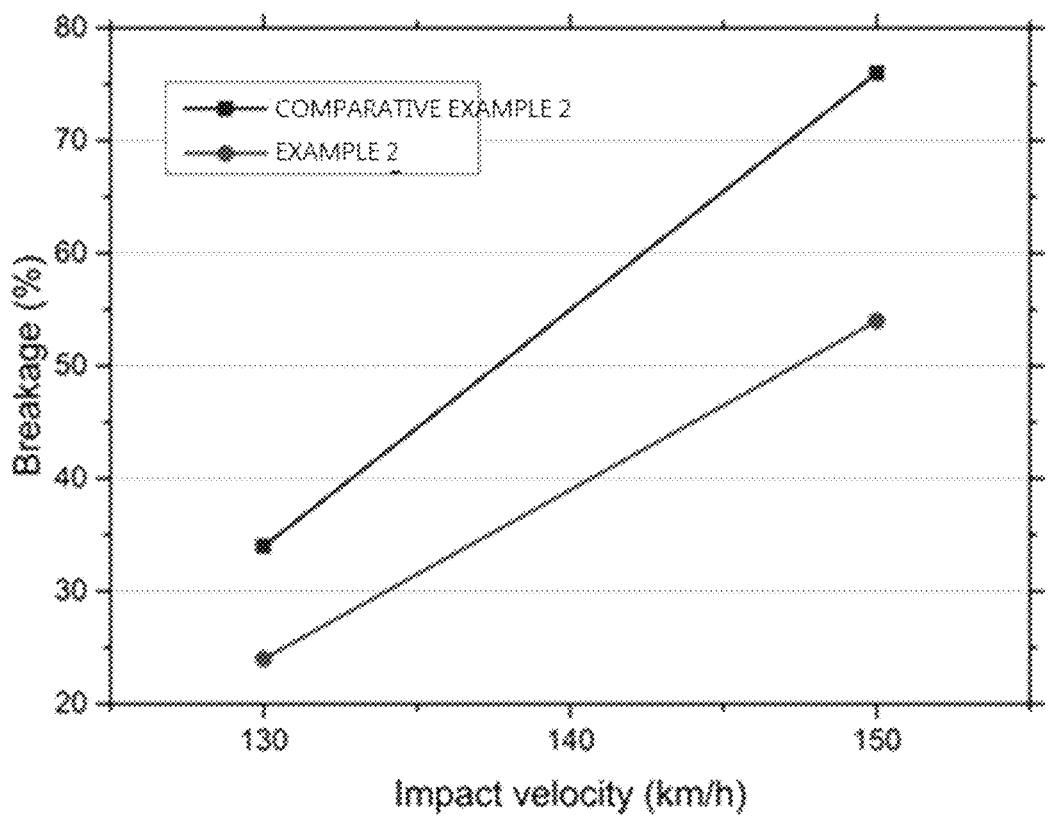

LAMINATED GLASS AND MANUFACTURING METHOD FOR LAMINATED GLASS

TECHNICAL FIELD

This application is a National Stage Application of International Application No. PCT/KR2017/004343, filed Apr. 25, 2017, and claims the benefit of Korean Patent Application No. 10-2016-0050973 filed on Apr. 26, 2016, the entire contents of which are incorporated herein by reference.

The present invention relates to laminated glass and a method of manufacturing laminated glass.

BACKGROUND ART

As a window of a transporting means, such as a vehicle, safety glass needs to be applied for protecting people sitting inside of a vehicle from external impact. Among such safety glass are laminated glass manufactured by inserting a copolymer film between glass and bonding the glass and the copolymer film, and tempered glass manufactured by increasing a temperature of glass to a high temperature and rapidly cooling the glass, and as laminated glass for a vehicle, laminated glass formed by bonding a bonding film between two sheets of soda lime glass in a sandwich form is used.

With recent growing interests in an environmentally-friendly vehicle in a vehicle industry, lightening technology which is capable of improving fuel efficiency and performance of a vehicle has received much attention. Since weight of the glass for a vehicle is about 3% of dry weight of a vehicle, a business industry continuously makes an effort to decrease a part of weight, and technology to reduce the weight of glass for a vehicle has been developed in efforts to lighten an environmentally-friendly and high-performance vehicle, and particularly, the need for manufacturing light and thin glass has arisen.

For example, laminated glass with improved lightness and wear resistance, in which ion enhanced glass is applied to laminated glass used in a front surface of a vehicle (Korean Patent Application Laid-Open No. 10-2014-0088704) is suggested. Further, a method using a PET film that is a sort of polymer instead of glass (Korean Patent Application Laid-Open No. 10-2009-0125537) is suggested.

The ion strengthened glass may secure excellent surficial hardness and breaking strength by forming surficial compression stress through ion exchange process, but when the ion strengthened glass is applied to an external side of front glass in a vehicle, damages incurred by an impact to a local region may be spread to an entire surface of the glass due to tensile stress existing inside the ion strengthened glass. In the meantime, when the ion strengthened glass is applied inside the front glass of the vehicle and the front glass is broken, a passenger may be injured due to scattering of small fragments. Further, when the glass is broken, a size of the fragment is small, obstructing the driver's field of vision.

In this respect, a technology for achieving lightness of laminated glass and simultaneously improving impact durability of the laminated glass is required.

RELATED ART DOCUMENT

Patent Document (Patent Document 1) Korean Patent Application Laid-Open No. 10-2014-0088704

(Patent Document 2) Korean Patent Application Laid-Open No. 10-2009-0125537

DETAILED DESCRIPTION OF THE INVENTION

Technical Problem

The present invention relates to laminated glass and a method of manufacturing laminated glass.

Technical Solution

According to an exemplary embodiment of the present invention, there is provided laminated glass, comprising: soda lime glass; and non-tempered alkali-free glass bonded to one surface of the soda lime glass, in which a thickness of the soda lime glass is larger than a thickness of the non-tempered alkali-free glass, and an elastic modulus of the non-tempered alkali-free glass is larger than an elastic modulus of the soda lime glass.

According to another exemplary embodiment of the present invention, there is provided a method of manufacturing laminated glass, the method comprising: preparing soda lime glass; preparing non-tempered alkali-free glass; and bonding the non-tempered alkali-free glass to one surface of the soda lime glass, in which a thickness of the soda lime glass is larger than a thickness of the non-tempered alkali-free glass, and an elastic modulus of the non-tempered alkali-free glass is larger than an elastic modulus of the soda lime glass.

Advantageous Effects

According to the exemplary embodiment of the present invention, it is possible to effectively lighten laminated glass by a high mechanical property of non-tempered alkali-free glass.

According to the exemplary embodiment of the present invention, it is possible to implement laminated glass having excellent wear resistance and durability.

According to another exemplary embodiment of the present invention, it is possible to economically manufacture laminated glass through a simple process.

BRIEF DESCRIPTION OF DRAWINGS

FIG. 1 is a diagram illustrating laminated glass according to an exemplary embodiment of the present invention.

FIGS. 2A and 2B are diagrams illustrating laminated glass according to another exemplary embodiment of the present invention.

FIG. 3 is a diagram illustrating stiffness obtained by thickness ratio of non-tempered alkali-free glass to soda lime glass according to an exemplary embodiment of the present invention.

FIG. 4 is a diagram illustrating a result of a ball impact test of laminated glass manufactured in Example 1, Example 2, Comparative Example 1, and Comparative Example 2 of the present invention.

FIG. 5 is a diagram illustrating a result of a high-speed impact test of laminated glass manufactured in Example 2 and Comparative Example 2 of the present invention.

MODE FOR CARRYING OUT THE INVENTION

Throughout the specification, unless explicitly described to the contrary, the word "comprise" and variations such as "comprises" or "comprising", will be understood to imply the inclusion of stated elements but not the exclusion of any other elements. Further, in the present specification, when it is said that a member is positioned "on" another member, this includes a case where the member is in contact with another member, and a case where another member is interposed between the two members.

Hereinafter, the present specification will be described in more detail.

According to an exemplary embodiment of the present invention, there is provided laminated glass, comprising: soda lime glass; and non-tempered alkali-free glass bonded to one surface of the soda lime glass, in which a thickness of the soda lime glass is larger than a thickness of the non-tempered alkali-free glass, and an elastic modulus of the non-tempered alkali-free glass is larger than an elastic modulus of the soda lime glass.

According to the exemplary embodiment of the present invention, it is possible to effectively lighten laminated glass by a high mechanical property of non-tempered alkali-free glass.

According to the exemplary embodiment of the present invention, the non-tempered alkali-free glass has a more excellent mechanical property than that of the soda lime glass, so that the laminated glass may include the non-tempered alkali-free glass having a smaller thickness than a thickness of the soda lime glass.

Therefore, according to the exemplary embodiment of the present invention, the non-tempered alkali-free glass that is thinner than the soda lime glass is used, thereby decreasing an entire thickness of the laminated glass and lightening the laminated glass.

According to the exemplary embodiment of the present invention, the non-tempered alkali-free glass has a higher elastic modulus than that of the soda lime glass. The non-tempered alkali-free glass has a higher elastic modulus than that of the soda lime glass, so that even when the laminated glass includes the non-tempered alkali-free glass that is lighter and thinner than the soda lime glass, the laminated glass may have a robust structure.

According to the exemplary embodiment of the present invention, a thickness ratio of the soda lime glass to the non-tempered alkali-free glass may be 1:0.1 to 1:0.5. Particularly, a thickness ratio of the soda lime glass to the non-tempered alkali-free glass may be 1:0.2 to 1:0.5. Adjusting the thickness ratio of the soda lime glass to the non-tempered alkali-free glass to the foregoing range, thereby it is possible to prevent a probability of breakage from being increased according to a decrease in stiffness of the laminated glass.

According to the exemplary embodiment of the present invention, the non-tempered alkali-free glass may have a more excellent mechanical property than that of the soda lime glass. An elastic modulus ratio of the soda lime glass to the non-tempered alkali-free glass may be 1:1.04 to 1:1.17. Particularly, an elastic modulus ratio of the soda lime glass to the non-tempered alkali-free glass may be 1:1.08 to 1:1.15. Since the non-tempered alkali-free glass has the elastic modulus of the foregoing range with respect to the soda lime glass, the laminated glass may have a robust structure even when the laminated glass includes the non-tempered alkali-free glass that is lighter and thinner than the soda lime glass.

According to the exemplary embodiment of the present invention, an elastic modulus of the non-tempered alkali-free glass may be 70 GPa or more and 90 GPa or less. Particularly, the non-tempered alkali-free glass may have an elastic modulus of 75 GPa or more and 85 GPa or less. Further, the soda lime glass may have an elastic modulus of 65 GPa or more and 75 GPa or less.

The elastic modulus of the non-tempered alkali-free glass and the soda lime glass may be measured through a three-point bending test.

Further, according to the exemplary embodiment of the present invention, the non-tempered alkali-free glass may have higher Vicker's hardness and fracture toughness than those of the soda lime glass.

According to the exemplary embodiment of the present invention, a Vicker's hardness ratio of the soda lime glass to the non-tempered alkali-free glass may be 1:1.15 to 1:1.27. Particularly, a Vicker's hardness ratio of the soda lime glass to the non-tempered alkali-free glass may be 1:1.2 to 1:1.25. The non-tempered alkali-free glass has higher hardness than that of the soda lime glass, thereby providing the laminated glass having excellent wear resistance, scratch resistance, and durability.

According to the exemplary embodiment of the present invention, Vicker's hardness of the non-tempered alkali-free glass may be 5.5 GPa or more and 7 GPa or less. Particularly, the non-tempered alkali-free glass may have Vicker's hardness of 5.8 GPa or more and 6.9 GPa or less, 6.0 GPa or more and 6.7 GPa or less, or 6.2 GPa or more and 6.5 GPa or less. Further, the soda lime glass may have Vicker's hardness of 5.2 GPa or more and 5.8 GPa or less.

According to the exemplary embodiment of the present invention, a fracture toughness ratio of the soda lime glass to the non-tempered alkali-free glass may be 1:1.37 to 1:1.45. Particularly, a fracture toughness ratio of the soda lime glass to the non-tempered alkali-free glass may be 1:1.39 to 1:1.45. The non-tempered alkali-free glass has fracture toughness of the foregoing range with respect to the soda lime glass, thereby improving fracture resistance of the laminated glass to an external impact and effectively preventing break strength of the laminated glass from being degraded.

According to the exemplary embodiment of the present invention, the fracture toughness of the non-tempered alkali-free glass may be 1.0 MPa·m$^{1/2}$ or more and 1.3 MPa·m$^{1/2}$ or less. Particularly, a value of fracture toughness of the non-tempered alkali-free glass measured by using an indentation fracture toughness measurement method may be 1.15 MPa·m$^{1/2}$ or more and 1.25 MPa·m$^{1/2}$ or less, or 1.18 MPa·m$^{1/2}$ or more and 1.21 MPa·m$^{1/2}$ or less. Further, the soda lime glass may have fracture toughness of 0.7 MPa·m$^{1/2}$ or more and 0.85 MPa·m$^{1/2}$ or less.

The values of the fracture toughness of the non-tempered alkali-free glass and the soda lime glass may be measured by using the indentation fracture toughness measurement method, and the Vickers hardness may be calculated by pressing glass by using a Vickers indenter and then measuring a size of an indented mark on glass surface.

As long as glass satisfies the foregoing fracture toughness, elastic modulus, Vicker's hardness, and the like, any glass formed of ingredients and amounts which are generally used as window glass of a transporting means in the art may be adopted and used as the non-tempered alkali-free glass according to the exemplary embodiment of the present invention without a particular limitation.

According to the exemplary embodiment of the present invention, as a composition of the non-tempered alkali-free glass, glass composition, which includes 46 wt % or more and 57 wt % or less of $SiO_2$, 21 wt % or more and 29 wt % or less of $Al_2O_3$, 3 wt % or more and 14 wt % or less of MgO, 11 wt % or more and 16 wt % or less of CaO, and 1 wt % or more and 5 wt % or less of SrO per 100 wt % of a composition, and does not substantially contain an alkali metal oxide, may be used.

The case where the glass composition does not substantially contain an alkali metal oxide means a case where an alkali metal oxide is not included in glass at all, or a case where an alkali metal oxide is partially included in glass, but a content of the alkali metal oxide is extremely small compared to other ingredients, so that the quantity of alkali metal oxide is ignorable as a composition ingredient of glass, and the like. For example, the term "substantially" has a meaning that the tiny quantity of alkali metallic elements inevitably mixed in glass from a refractory that is in contact with melt glass or impurities of a glass raw material may be contained in a glass manufacturing process.

In the exemplary embodiment of the present invention, as the non-tempered alkali-free glass, alkali-free glass containing less than 1% of an oxide of alkali metal (Li, Na, K, and the like) based on a mass percentage indication of an oxide conversion may be used, and as long as a desired mechanical property, weather resistance, surface smoothness, and the like may be obtained, the non-tempered alkali-free glass may be used without a limitation. As the non-tempered alkali-free glass, alkali-free alumina borosilicated glass or alkali-free alumino borosilicated glass may be used, and glass manufactured by a float method, glass manufactured by a down draw scheme or a fusion scheme may also be used.

Further, the non-tempered alkali-free glass has no alkali ingredient or includes the extremely small quantity of alkali ingredient which degrades bridging oxygen link of glass, so that the non-tempered alkali-free glass has higher wear resistance and impact resistance of a surface with a small thickness than those of soda lime glass, thereby effectively lightening laminated glass and improving wear resistance and durability of laminated glass According to the exemplary embodiment of the present invention, the alkali-free glass may be non-tempered glass. The non-tempered alkali-free glass may be non-tempered glass which is not chemically tempered, non-tempered glass which is not tempered with heat, or non-tempered glass which is not tempered by using a chemical method and heat.

In general, tempered glass is glass having improved strength and having impact resistance, elastic resistance, and the like, and includes thermally tempered glass using physical heat and chemically tempered glass using a chemical ion exchange. When the laminated glass is manufactured by using the tempered glass, processing and forming of the tempered glass is not easy, so that a defective rate of the laminated glass is high and cost for manufacturing the laminated glass is high. Further, the ion tempered glass requires a washing process after an ion tempering process during a predetermined time at a high temperature, so that a manufacturing time and manufacturing cost of the laminated glass are increased.

In the meantime, according to the exemplary embodiment of the present invention, it is possible to use the non-tempered alkali-free glass which does not pass through a process, such as chemical tempering and thermal tempering, thereby processing of the non-tempered alkali-free glass is easy and a tempering process is omitted, so that it is possible to decrease manufacturing cost, thereby solving a problem incurable during the process of manufacturing the laminated glass by using the tempered glass in the art and decreasing manufacturing cost and time. Further, the alkali-free glass is not tempered, so that even when the alkali-free glass is broken during the application of the alkali-free to a windshield, a driver's field of vision may be easily secured.

As long as the glass satisfies the foregoing fracture toughness, elastic modulus, Vicker's hardness, and the like, any glass formed of ingredients and amounts which are generally used as window glass of a transporting means in the art may be adopted and used as the soda lime glass according to the exemplary embodiment of the present invention without a particular limitation. For example, glass having a composition comprising 65 wt % or more and 75 wt % or less of $SiO_2$, 0 wt % or more and 10 wt % or less of $Al_2O_3$, 10 wt % or more and 15 wt % or less of $NaO_2$, 0 wt % or more and 5 wt % or less of $K_2O$, 1 wt % or more and 12 wt % or less of CaO, and 0 wt % or more and 8 wt % or less of MgO per 100 wt % of a composition may be used as the soda lime glass, but as long as a desired mechanical property, weather resistance, surface smoothness, and the like may be obtained, the soda lime glass may be used without a limitation. Further, as the soda lime glass, glass manufactured by a float method using a float bath and glass manufactured by a down draw scheme or a fusion scheme may also be used.

According to the exemplary embodiment of the present invention, a thickness of the non-tempered alkali-free glass may be 0.3 mm or more and 1.0 mm or less. The non-tempered alkali-free glass may be manufactured with a thickness of 0.3 mm or more and 1.0 mm or less, and particularly, a thickness of 0.3 mm or more and 0.7 mm or less, and more particularly, a thickness of 0.4 mm or more and 0.5 mm or less.

When a thickness of the non-tempered alkali-free glass is less than 0.3 mm, impact resistance of the laminated glass may be decreased, and when a thickness of the non-tempered alkali-free glass is larger than 1 mm, it may be difficult to obtain a lightening effect of the laminated glass.

Therefore, according to the exemplary embodiment of the present invention, by the high mechanical property of the non-tempered alkali-free glass having the foregoing thickness, it is possible to achieve the lightening of the laminated glass, the laminated glass is strong to local impact, and even when the laminated glass is damaged, secondary damage by an obstruction in a user's field of vision or scattered glass is very little than tempered glass.

According to the exemplary embodiment of the present invention, the soda lime glass may be manufactured with a thickness of 2 mm or more and 3 mm or less. When a thickness of the soda lime glass is less than 2 mm, impact resistance of the manufactured laminated glass may be decreased, and when a thickness of the soda lime glass is larger than 3 mm, it may be difficult to obtain a lightening effect of the laminated glass. Accordingly, a thickness of the soda lime glass may be 2 mm or more and 3 mm or less.

Further, upper limit values and lower limit values of the thicknesses of the non-tempered alkali-free glass and the soda lime glass may be determined in consideration of elastic absorption of external force and mechanical impact force.

According to the exemplary embodiment of the present invention, the laminated glass which comprise the non-tempered alkali-free glass and the soda lime glass having the foregoing thicknesses may have a thickness of 50% or more and 80% or less of a thickness of existing laminated glass formed by bonding two sheets of soda lime glass, each of which has a thickness of about 2.1 mm, and may have weight of 50% or more and 80% or less of the existing laminated glass. Therefore, according to the exemplary embodiment of the present invention, it is possible to provide the lighter and thinner laminated glass than the existing laminated glass.

According to the exemplary embodiment of the present invention, the non-tempered alkali-free glass may be bonded to one surface of the soda lime glass by a bonding film or a bonding agent.

FIG. 1 is a diagram illustrating laminated glass according to an exemplary embodiment of the present invention. FIG. 1 illustrates the laminated glass according to an exemplary embodiment of the present invention, in which a bonding film 20 is interposed between soda lime glass 10 and non-tempered alkali-free glass 30, and the soda lime glass 10 is bonded to the no-tempered alkali-free glass 30.

The bonding film according to the exemplary embodiment of the present invention may have a single layer or multiple layers. Further, when the bonding film has two or more layers, the compositions of the respective layers may be different from each other, and the thicknesses of the respective layers may be the same as each other or may be different from each other. A (co)polymer film, such as a polyvinyl alcohol (PVA) copolymer film and polyvinyl butyral (PVB) copolymer film, formed of a material generally used as a bonding layer in laminated glass in the art may be adopted and used as the bonding film without a particular limitation. Particularly, polyethylene (PE), ethylene acetic acid vinyl copolymer (EVA), polypropylene (PP), polystyrene (PS), methacrylic resin (PMA), polyvinyl chloride (PVC), polyethylene terephthalate (PET), polybutylene terephthalate (PBT), cellulose acetate (CA), diallylphthalate resin (DAP), urea resin (UP), melamine resin (MF), unsaturated polyester (UP), polyvinyl butyral (PVB), polyvinyl formal (PVF), polyvinyl alcohol (PVAL), acetic acid vinyl resin (PVAc), ionomer (IO)), polymethylpentene (TPX), vinylidene chloride (PVDC), polysulfone (PSF), polyvinylidene fluoride (PVDF), methacryl-styrene copolymerization resin (MS), polyarylate (PAR), polyarylsulfone (PASF), polybutadiene (BR), polyether sulfone (PESF), or polyether ether ketone (PEEK) may be used. A bonding film having bonding force, with which the non-tempered alkali-free glass and the soda lime glass may be fixed with desired strength, and which has excellent penetration performance with respect to visible rays and chemical durability, may be used as the bonding film.

According to the exemplary embodiment of the present invention, a thickness of the bonding film may be 0.5 mm or more and 1 mm or less. Particularly, a thickness of the bonding film may be 0.6 mm or more and 0.9 mm or less. When a thickness of the bonding film is less than 0.5 mm, impact absorbing performance of the lamination film is degraded, and bonding force for the non-tempered alkali-free glass and the soda lime glass is not sufficient, so that power for fixing the non-tempered alkali-free glass and the soda lime glass is weakened and an interface may be peeled off. In the meantime, when a thickness of the bonding film is larger than 1.0 mm, hardness of the laminated glass may be decreased.

Therefore, according to the exemplary embodiment of the present invention, in order to maintain hardness or the laminated glass and stably fix the non-tempered alkali-free glass and the soda lime glass, thickness of the bonding film may be 0.5 mm or more and 1 mm or less.

According to the exemplary embodiment of the present invention, the bonding agent may comprise an optically clear adhesive (OCA), a liquid optically clear adhesive (LOCA), or an optically clear resin (OCR). The bonding agent may be applied onto one surface of the non-tempered alkali-free glass or one surface of the soda lime glass with a thickness of 0.5 mm or more and 1.5 mm or less.

According to the exemplary embodiment of the present invention, the laminated glass may be curved laminated glass which is bent to form a curved surface in a state where the non-tempered alkali-free glass and the soda lime glass are matched. One surface of the non-tempered alkali-free glass which is bent to form the curved surface and one surface of the soda lime glass which is bent to form the curved surface are precisely in close contact with each other and matched, so that it is possible to form the curved laminated glass.

Therefore, according to the exemplary embodiment of the present invention, it is possible to provide curved laminated glass, comprising: soda lime glass; and non-tempered alkali-free glass bonded to one surface of the soda lime glass, in which a thickness of the soda lime glass is larger than a thickness of the non-tempered alkali-free glass, an elastic modulus of the non-tempered alkali-free glass is larger than an elastic modulus of the soda lime glass, and the non-tempered alkali-free glass and the soda lime glass are bent to form a curved surface in a matched state.

Further, in the state where the non-tempered alkali-free glass bent to form the curved surface and the soda lime glass bent to form the curved surface are matched, the non-tempered alkali-free glass and the soda lime glass may form an edge together at the same position. The non-tempered alkali-free glass and the soda lime glass are matched, so that it is possible to suppress the glass from being separated from each other in the curved laminated glass and improve penetration performance of the curved laminated glass.

In the curved laminated glass, the non-tempered alkali-free glass and the soda lime glass are bent while having the curved surface in the matched state, and the non-tempered alkali-free glass bent while having the curved surface may be positioned on one convex surface or the other concave surface of the soda lime glass bent while having the curved surface.

According to the exemplary embodiment of the present invention, the curved laminated glass, in which the non-tempered alkali-free glass and the soda lime glass are bent while having the curved surface in the matched state, may have a structure, of which both sides are more bent than a center portion. The curved laminated glass having the structure may be applied to glass for a vehicle. For example, the curved laminated glass may be applied to a front window, a side window, a rear window, and a sunroof window among the glass for a vehicle. Particularly, when the curved laminated glass is applied to the front window among the glass for a vehicle, it is possible to decrease resistance to driving wind hitting during a travelling of the vehicle by the streamlined curved shape.

FIGS. 2A and 2B are diagrams illustrating laminated glass according to another exemplary embodiment of the present invention.

Referring to FIG. 2A, the non-tempered alkali-free glass 30 bent while having the curved surface may be positioned on one convex surface of the soda lime glass 10 bent while having the curved surface. Curved laminated glass 41, in which one surface of the non-tempered alkali-free glass 30 bent while having the curved surface is bonded to the one convex surface of the soda lime glass 10 bent while having the curved surface, may be used as glass for a vehicle. When the non-tempered alkali-free glass 30 is positioned at an external side of the glass for the vehicle, the glass for the vehicle may obtain high scratch resistance and high glass surface hardness. Accordingly, it is possible to effectively decrease damage by impact of an external foreign material, such as sand, blowing from the external side of the vehicle. Further, the non-tempered alkali-free glass has high fracture toughness, so that it is possible to provide glass for a vehicle having excellent fracture resistance by external impact.

Referring to FIG. 2B, the non-tempered alkali-free glass 30 bent while having the curved surface may be positioned on the other concave surface of the soda lime glass 10 bent while having the curved surface. Curved laminated glass 42, in which one surface of the non-tempered alkali-free glass 30 bent while having the curved surface is bonded to the other concave surface of the soda lime glass 10 bent while having the curved surface, may be used as glass for a vehicle. In the case where the non-tempered alkali-free glass 30 is positioned at an internal side of the glass for the vehicle, even when the curved laminated glass 42 is am the non-tempered glass 30 not scattered, thereby it is possible to effectively prevent a passenger from being injured.

According to the exemplary embodiment of the present invention, the non-tempered alkali-free glass bent while having the curved surface and the soda lime glass bent while having the curved surface may have the same curvature radius. The soda lime glass bent while having the curved surface and the non-tempered alkali-free glass bent while having the curved surface may have a curvature radius of 3,000 mm or more and 10,000 mm or less. Particularly, a curvature radius of the bonded soda lime glass and non-tempered alkali-free glass may be 4,000 mm or more and 8,000 mm or less, or 5,000 mm or more and 7,000 mm or less. However, the curvature radius of the soda lime glass and the non-tempered alkali-free glass may be differently formed according to a usage of glass to which the laminated glass is applied.

FIG. 3 is a diagram illustrating stiffness obtained by thickness ratio of non-tempered alkali-free glass to soda lime glass according to an exemplary embodiment of the present invention. In FIG. 3, an x-axis represents a total thickness of glass, and a y-axis represents the quantity of drooping of glass, that is, the degree of bending of glass. Referring to FIG. 3, in a state where four corners of the curved laminated glass according to the exemplary embodiment of the present disclosure are fixed, the amount of drooping at a center portion of the curved laminated glass was analyzed by applying a predetermined load to the center portion.

According to the exemplary embodiment of the present invention, an asymmetry ratio (AR) that is [thickness of non-tempered alkali-free glass]/[thickness of soda lime glass] may satisfy a range of 0.1 to 0.5. When the AR is decreased, a thickness of the non-tempered alkali-free glass is decreased and a thickness of the soda lime glass is increased. As can be seen in FIG. 3, it is possible to secure stiffness of the curved laminated glass by decreasing the degree of bending of the curved laminated glass by adjusting the thicknesses of the non-tempered alkali-free glass and the soda lime glass. Accordingly, according to the exemplary embodiment of the present invention, it is possible to further improve an increase effect of hardness and a lightening effect of the curved laminated glass, by adjusting the thicknesses of the non-tempered alkali-free glass (200) and the soda lime glass (100).

Each of the non-tempered alkali-free glass and the soda lime glass according to the exemplary embodiment of the present invention may independently additionally include one or more kinds of coloring ingredient. The coloring ingredient is added to the non-tempered alkali-free glass and the soda lime glass, thereby assigning a heat blocking function to the laminated glass. As the coloring ingredient, $Fe_2O_3$, CoO, Se, and the like may be used, but the coloring ingredient is not limited thereto. Further, a content of each coloring ingredient may be 0.0001 or more parts by weight and 2 or less parts by weight, 0.0005 or more parts by weight and 1 or less parts by weight, or 0.01 or more parts by weight and 0.1 or less parts by weight with respect to 100 parts by weight of a glass composition. However, the contents of the coloring ingredient may be adjusted according to a usage of the laminated glass. When the laminated glass is applied to a front window or side and rear windows among the glass for a vehicle, a penetration ratio of visible rays of the laminated glass may be formed with 70% or more by adjusting the content of the coloring ingredient. Further, when the laminated glass is applied to a sunroof window among the glass for a vehicle, a penetration ratio of visible rays of the laminated glass may be formed with about 5%.

According to another exemplary embodiment of the present invention, there is provided a method of manufacturing laminated glass, the method comprising: preparing soda lime glass; preparing non-tempered alkali-free glass; and bonding the non-tempered alkali-free glass to one surface of the soda lime glass, in which a thickness of the soda lime glass is larger than a thickness of the alkali-free glass, and an elastic modulus of the non-tempered alkali-free glass is larger than an elastic modulus of the soda lime glass.

According to another exemplary embodiment of the present invention, it is possible to economically manufacture the laminated glass through a simple process.

The non-tempered alkali-free glass, the soda lime glass, a bonding film, and the like used in the method of manufacturing the laminated glass according to another exemplary embodiment of the present invention may be the same as the non-tempered alkali-free glass, the soda lime glass, the bonding film, and the like used in the laminated glass according to the exemplary embodiment of the present invention.

According to another exemplary embodiment of the present invention, a mechanical property of the non-tempered alkali-free glass is more excellent than that of the soda lime glass, so that it is possible to manufacture the laminated glass by using the non-tempered alkali-free glass which has a smaller thickness than a thickness of the soda lime glass. Therefore, according to another exemplary embodiment of the present invention, it is possible to easily manufacture the light and thin laminated glass.

According to another exemplary embodiment of the present invention, in the preparing of the soda lime glass and the preparing of the non-tempered alkali-free glass, the soda lime glass and the non-tempered alkali-free glass may be cut with desired sizes. Further, in order to prevent the soda lime glass and the non-tempered alkali-free glass from being damaged during the process of manufacturing the laminated glass, lateral surfaces of the soda lime glass and the non-tempered alkali-free glass may be beveling-processed.

According to another exemplary embodiment of the present invention, in the bonding operation, the non-tempered alkali-free glass may be bonded to the soda lime glass by using a bonding film or a bonding agent. It is possible to manufacture the laminated glass by bonding the non-tempered alkali-free glass and the soda lime glass by using a bonding film or a bonding agent. Particularly, it is possible to manufacture the laminated glass by positioning a bonding film between one surface of the non-tempered alkali-free glass and one surface of the soda lime glass, and then pressing and heating the non-tempered alkali-free glass and the soda lime glass. The bonding film may be transformed during the process of positioning the bonding film between one surface of the non-tempered alkali-free glass and one surface of the soda lime glass, and then pressing and heating the non-tempered alkali-free glass and the soda lime glass. Therefore, it is possible to cut and use the bonding film by considering the degree of transformation of the bonding film.

Further, it is possible to bond one surface of the non-tempered alkali-free glass to one surface of the soda lime glass through the bonding agent by applying the bonding agent onto the one surface of the non-tempered alkali-free glass.

According to another exemplary embodiment of the present invention, the bonding operation may be performed at a temperature of 80° C. or more and 140° C. or less. According to another exemplary embodiment of the present invention, the non-tempered alkali-free glass and the soda lime glass are bonded at the temperature of 80° C. or more and 140° C. or less, thereby it is possible to prevent bonding force from being decreased by degeneration of the bonding film or the bonding agent, and to decrease manufacturing cost.

Further, the bonding of the non-tempered alkali-free glass and the soda lime glass may be completed by additional a process of performing the non-tempered alkali-free glass and the soda lime glass in an autoclave at a high temperature and high pressure.

According to another exemplary embodiment of the present invention, it is possible to further include processing the soda lime glass or the non-tempered alkali-free glass to form a curved surface. In the operation of processing the soda lime glass or the non-tempered alkali-free glass to form the curved surface, the soda lime glass may be processed to form the curved surface by heating the soda lime glass up to a point around a softening point of the soda lime glass, and the non-tempered alkali-free glass may be processed to form the curved surface by heating the non-tempered alkali-free glass up to a point around a softening point of the non-tempered alkali-free glass.

The processing of the soda lime glass and the non-tempered alkali-free glass to form the curved surface may be performed by a general method in the art. Particularly, the soda lime glass or the non-tempered alkali-free glass may be formed by a self-weight method which exposes the soda lime glass or the non-tempered alkali-free glass to a high temperature in a state where the soda lime glass or the non-tempered alkali-free glass is put on a molding frame, or the soda lime glass or the non-tempered alkali-free glass may be formed by a press method of inserting the soda lime glass or the non-tempered alkali-free glass between upper mold and lower mold and then applying pressure at a high temperature.

According to another exemplary embodiment of the present invention, the soda lime glass is processed to form the curved surface, and the non-tempered alkali-free glass is transformed during the process of bonding the non-tempered alkali-free glass onto one surface of the soda lime glass having the curved surface, thereby manufacturing the curved laminated glass. Particularly, the non-tempered alkali-free glass may be elastically transformed during the process of bonding the non-tempered alkali-free glass onto one surface of the soda lime glass having the curved surface. It is possible to elastically transform the non-tempered alkali-free glass at a room temperature of about 20° C. or more and 35° C. or less through a compression process using a high-temperature roller or a vacuum ring/vacuum bag process.

According to another exemplary embodiment of the present invention, it is possible to manufacture the curved laminated glass by processing the non-tempered alkali-free glass to form a curved surface, and transforming the soda lime glass during a process of bonding the soda lime glass to one surface of the non-tempered alkali-free glass processed in the curved surface. As long as the method of transforming the soda lime glass is a method generally used in the art, the method is not particularly limited.

Further, according to another exemplary embodiment of the present invention, it is possible to manufacture the curved laminated glass by processing each of the non-tempered alkali-free glass and the soda lime glass to form a curved surface, and bonding the non-tempered alkali-free glass processed in the curved surface and the soda lime glass processed in the curved surface.

According to another exemplary embodiment of the present invention, the soda lime glass may be processed to form the curved surface at a temperature of 500° C. or more and 700° C. or less, and the non-tempered alkali-free glass may be processed to form the curved surface at a temperature of 700° C. or more and 900° C. or less. It is possible to easily process the soda lime glass and the non-tempered alkali-free glass so as to have desired curvature radiuses by processing the soda lime glass and the non-tempered alkali-free glass to form the curved surfaces within the foregoing temperature ranges.

According to another exemplary embodiment of the present invention, the soda lime glass and the non-tempered alkali-free glass may be processed to form the curved surfaces so that the soda lime glass and the non-tempered alkali-free glass substantially have the same curvature radius.

The processing of the soda lime glass and the non-tempered alkali-free glass to form the curved surfaces in which the soda lime glass and the non-tempered alkali-free glass substantially have the same curvature radius may mean that when the soda lime glass processed to form the curved surface and the non-tempered alkali-free glass processed to form the curved surface have the same curvature radius, the soda lime glass and the non-tempered alkali-free glass have the same curvature radius after the soda lime glass processed to form the curved surface is bonded to the non-tempered alkali-free glass processed to form the curved surface, even though a curvature radius of the soda lime glass processed to form the curved surface is slightly different from that of the non-tempered alkali-free glass processed to form the curved surface.

The non-tempered alkali-free glass bonded to the soda lime glass processed to form the curved surface and the soda lime glass processed to form the curved surface may have the same curvature radius, so that the soda lime glass may be more precisely matched with the non-tempered alkali-free glass, thereby improving penetration performance of the curved laminated glass. When the curved laminated glass is used for a front window for a vehicle, a user may more clearly secure a field of vision.

The soda lime glass processed to form the curved surface and the non-tempered alkali-free glass processed to form the curved surface may have curvature radiuses of 3,000 mm or more and 10,000 mm or less. Particularly, the bonded soda lime glass and non-tempered alkali-free glass may have curvature radiuses of 4,000 mm or more and 8,000 mm or less, or 5,000 mm or more and 7,000 mm or less. However, the curvature radiuses of the soda lime glass and the non-tempered alkali-free glass may be differently formed according to a usage of the laminated glass.

The soda lime glass processed to form the curved surface and the non-tempered alkali-free glass processed to form the curved surface may be bonded by using a bonding film or a bonding agent. Particularly, it is possible to manufacture the curved laminated glass by positioning a bonding film between one surface of the non-tempered alkali-free glass processed to form the curved surface and one convex surface or the other concave surface of the soda lime glass processed to form the curved surface, and pressing the non-tempered alkali-free glass processed to form the curved surface and the soda lime glass processed to form the curved surface. Further, one surface of the non-tempered alkali-free glass may be bonded to one surface or the other surface of the soda lime glass through the bonding agent, by applying a bonding agent onto one surface of the non-tempered alkali-free glass processed to form the curved surface.

According to another exemplary embodiment of the present invention, as illustrated in FIG. 2A, it is possible to manufacture the curved laminated glass by bonding the non-tempered alkali-free glass processed to form the curved surface to one convex surface of the soda lime glass processed to form the curved surface. Since the non-tempered alkali-free glass is bonded to one convex surface of the soda lime glass, the non-tempered alkali-free glass shaped like a plate before being processed to form the curved surface may have a larger size than a size of the soda lime glass shaped like a plate before being processed to form the curved surface. Further, the non-tempered alkali-free glass processed to form the curved surface may be bonded to the soda lime glass processed to form the curved surface so that the non-tempered alkali-free glass processed to form the curved surface and the soda lime glass processed to form the curved surface form an edge together at the same position and are matched with each other.

According to another exemplary embodiment of the present invention, as illustrated in FIG. 2B, it is possible to manufacture the curved laminated glass by bonding the non-tempered alkali-free glass processed to form the curved surface to the other concave surface of the soda lime glass processed to form the curved surface. Since the non-tempered alkali-free glass is bonded to the other concave surface of the soda lime glass, the non-tempered alkali-free glass shaped like a plate before being processed to form the curved surface may have a smaller size than a size of the soda lime glass shaped like a plate before being processed to form the curved surface. Further, the non-tempered alkali-free glass processed to form the curved surface may be bonded to the soda lime glass processed to form the curved surface so that the non-tempered alkali-free glass processed to form the curved surface and the soda lime glass processed to form the curved surface form an edge together at the same position and are matched with each other.

Hereinafter, the present invention will be described in more detail through Examples. The Examples are simply illustrative, and do not limit the present invention.

Example 1

Alkali-free glass, which includes 61 wt % of $SiO_2$, 16 wt % of $Al_2O_3$, 3 wt % of MgO, 8 wt % or less of CaO, and 0.05 wt % of SrO per 100 wt % of a composition and has a thickness of 0.5 mm, was prepared as non-tempered alkali-free glass, and soda lime glass, which includes 73 wt % of $SiO_2$, 0.15 wt % of $Al_2O_3$, 14 wt % of $Na_2O$, 0.03 wt % of $K_2O$, 9 wt % of CaO, and 4 wt % of MgO per 100 wt % of a composition and has a thickness of 2.0 mm, was prepared. Further, a polyvinyl butyral (PVB) film having a thickness of 0.76 mm was prepared as a bonding film. The non-tempered alkali-free glass has an elastic modulus of 78 GPa, has Vicker's hardness of 6.3 GPa, and has fracture toughness of 1.20 mpa·m$^{1/2}$, and the soda lime glass has an elastic modulus of 72 GPa, has Vicker's hardness of 5.6 GPa, and has fracture toughness of 0.85 MPa·m$^{1/2}$.

First, a bonding film was put between the soda lime glass and the alkali-free glass, and the soda lime glass and the alkali-free glass was compressed at 80° C. under a temperature condition of 300 torr. The compressed alkali-free glass and soda lime glass were processed in an autoclave at 130° C. under a condition of 11.76 bar to manufacture laminated glass.

Example 2

In Example 2, except for preparing soda lime glass having a thickness of 2.1 mm, laminated glass was manufactured by the same method as that of Example 1.

Comparative Example 1

Two sheets of soda lime glass, which includes 73 wt % of $SiO_2$, 0.15 wt % of $Al_2O_3$, 14 wt % of $Na_2O$, 0.03 wt % of $K_2O$, 9 wt % of CaO, and 4 wt % of MgO per 100 wt % of a composite and has a thickness of 2.0 mm, and a PVB film having a thickness of 0.34 mm as a bonding film were prepared. The soda lime glass has an elastic modulus of 72 GPa, has Vicker's hardness of 5.6 GPa, and has fracture toughness of 0.85 MPa·m$^{1/2}$. A bonding film was put between the two sheets of soda lime glass, and the two sheets of glass were compressed at 80° C. under a pressure condition of 300 torr. The compressed soda lime glass was processed in an autoclave at 130° C. under a condition of 11.76 bar to manufacture laminated glass.

Comparative Example 2

In Example 2, except for preparing two sheets of soda lime glass having a thickness of 2.1 mm, laminated glass was manufactured by the same method as that of Comparative Example 1.

Ball Impact Test

A ball impact test of the laminated glass manufactured in Example 1, Example 2, Comparative Example 1, and Comparative Example 2 was progressed as described below.

50 samples of each of the laminated glass manufactured in Example 1, Example 2, Comparative Example 1, and Comparative Example 2 were prepared by cutting the laminated glass manufactured in Example 1, Example 2, Comparative Example 1, and Comparative Example 2 into a size of 300 mm in width and 300 mm in length. The ball impact test was progressed by a method of disposing the prepared samples so that the soda lime glass was positioned at an upper side, and applying impact to the samples by dropping a ball having weight of 227 g at a height of 2.8 mm from the samples.

FIG. 4 is a diagram illustrating a result of the a ball impact test of the laminated glass manufactured in Example 1, Example 2, Comparative Example 1, and Comparative Example 2 of the present invention. FIG. 4 represents dropping ball impact breakage rates for the 50 samples of each of the laminated glass manufactured in Example 1, Example 2, Comparative Example 1, and Comparative Example 2. The ball impact breakage rate means a ratio of the damaged samples confirmed with the eyes to the 50 samples on which the dropping ball impact test is performed.

Referring to FIG. 4, it can be seen that even though the non-tempered alkali-free glass included in the laminated glass manufactured in Example 1 and Example 2 of the present invention has a smaller thickness than that of the soda lime glass included in the laminated glass manufactured in Comparative Example 1 and Comparative Example 2, the laminated glass manufactured in Example 1 and Example 2 of the present invention has smaller breakage rates with respect to the dropping ball impact than those of Comparative Example 1 and Comparative Example 2 comprising two sheets of soda lime glass.

High-Speed Impact Test

A high-speed impact test for the laminated glass manufactured in Example 2 and Comparative Example 2 was progressed as described below.

50 samples of each of the laminated glass manufactured in Example 2 and Comparative Example 2 were prepared by cutting the laminated glass manufactured in Example 2 and Comparative Example 2 into a size of 300 mm in width and 300 mm in length. A high-speed impact test was progressed by a method of 45° standing the prepared samples from the ground and discharging a ball of 1 g toward the samples of the soda lime glass at speeds of 130 km/h and 150 km/h.

FIG. 5 is a diagram illustrating a result of the high-speed impact test of the laminated glass manufactured in Example 2 and Comparative Example 2 of the present invention. FIG. 5 represents an average value of high-speed moving object impact breakage rates for the 50 samples of each of the laminated glass manufactured in Example 2 and Comparative Example 2. The high-speed moving object impact breakage rate means a ratio of the samples, which are damaged when are confirmed visually with the eyes, among the 50 samples on which the high-speed moving object impact test is performed.

Referring to FIG. 5, it can be seen that a breakage rate of the laminated glass manufactured in Example 2 of the present invention is smaller than that of the laminated glass manufactured in Comparative Example 2 with respect to a ball discharged at a speed of 130 km/h and a ball discharged at a speed of 150 km/h.

EXPLANATION OF REFERENCE NUMERALS AND SYMBOLS

10: Soda lime glass
20: Bonding film
30: Non-tempered alkali-free glass
40: Laminated glass
41, 42: Curved laminated glass

The invention claimed is:

1. A laminated glass for vehicles, comprising:
a soda lime glass; and
a non-tempered alkali-free glass bonded to one surface of the soda lime glass,
wherein a thickness ratio of the soda lime glass to the non-tempered alkali-free glass is 1:0.1 to 1:0.5,
wherein an elastic modulus ratio of the soda lime glass to the non-tempered alkali-free glass is 1:1.08 to 1:1.17, and
wherein the thickness of the non-tempered alkali-free glass is 0.4 mm or more and 1.0 mm or less.

2. The laminated glass for vehicles of claim 1, wherein the elastic modulus of the non-tempered alkali-free glass is 70 GPa or more and 90 GPa or less.

3. The laminated glass for vehicles of claim 1, wherein Vicker's hardness ratio of the soda lime glass to the non-tempered alkali-free glass is 1:1.15 to 1:1.27.

4. The laminated glass for vehicles of claim 1, wherein the non-tempered alkali-free glass is bonded to the one surface of the soda lime glass by a bonding film or a bonding agent.

5. The laminated glass for vehicles of claim 1, wherein the laminated glass is a curved laminated glass, in which the non-tempered alkali-free glass and the soda lime glass are bent to form a curved surface while being in a matched state.

6. A method of manufacturing laminated glass for vehicles, the method comprising:
preparing a soda lime glass;
preparing a non-tempered alkali-free glass; and
bonding the non-tempered alkali-free glass to one surface of the soda lime glass,
wherein a thickness ratio of the soda lime glass to the non-tempered alkali-free glass is 1:0.1 to 1:0.5,
wherein an elastic modulus ratio of the soda lime glass to the non-tempered alkali-free glass is 1:1.08 to 1:1.17, and
wherein the thickness of the non-tempered alkali-free glass is 0.4 mm or more and 1.0 mm or less.

7. The method of claim 6, wherein the bonding is conducted at a temperature of 80° C. or more and 140° C. or less.

8. The method of claim 6, wherein the bonding comprises bonding the non-tempered alkali-free glass to the soda lime glass by using a bonding film or a bonding agent.

9. The method of claim 6, further comprising:
processing the soda lime glass or the non-tempered alkali-free glass to form a curved surface.

10. The method of claim 9, wherein the soda lime glass is processed to form the curved surface at a temperature of 500° C. or more and 700° C. or less.

11. The method of claim 9, wherein the non-tempered alkali-free glass is processed to form the curved surface at a temperature of 700° C. or more and 900° C. or less.

* * * * *